US007375844B2

(12) United States Patent
Kitahara et al.

(10) Patent No.: US 7,375,844 B2
(45) Date of Patent: May 20, 2008

(54) METHOD FOR GENERATING A PRINT DATA FILE, METHOD FOR STORING PRINT DATA, A DATA STORAGE MEDIUM THEREFOR, AND AN APPARATUS FOR GENERATING A DATA STORAGE FILE

(75) Inventors: Katsuhito Kitahara, Kagashima (JP); Yukiharu Horiuchi, Chino (JP); Kazuyuki Yokoyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1204 days.

(21) Appl. No.: 10/016,940

(22) Filed: Dec. 13, 2001

(65) Prior Publication Data

US 2002/0085230 A1 Jul. 4, 2002

Related U.S. Application Data

(60) Provisional application No. 60/317,795, filed on Sep. 7, 2001.

(30) Foreign Application Priority Data

Dec. 22, 2000 (JP) ............... 2000-390421

(51) Int. Cl.
*G06K 15/00* (2006.01)
*H04M 11/00* (2006.01)
(52) U.S. Cl. .............. 358/1.6; 358/1.16; 379/93.12
(58) Field of Classification Search .......... 358/1.2, 358/1.9, 1.6, 3.06, 1.15, 1.16, 1.17, 1.13, 358/404, 444, 118; 328/1.16; 379/93.08, 379/100.01, 100.05, 100.12, 93.12
See application file for complete search history.

(56) References Cited

U.S. PATENT DOCUMENTS

| 4,837,613 A | 6/1989 | Paxton et al. |
| 4,873,570 A | 10/1989 | Suzuki et al. |
| 5,045,967 A | 9/1991 | Igarashi |
| 5,146,346 A | 9/1992 | Knoll |
| 5,297,286 A * | 3/1994 | Uehara .................. 713/1 |
| 5,371,873 A * | 12/1994 | Niwa .................. 710/20 |
| 5,422,985 A * | 6/1995 | Tanaka .................. 358/1.14 |

(Continued)

FOREIGN PATENT DOCUMENTS

EP 0 596 706 5/1994

(Continued)

OTHER PUBLICATIONS http://javaalmanac.com/egs/java.net/SendDatagram.html.*

(Continued)

*Primary Examiner*—Jerome Grant, II (57) ABSTRACT

A method and system for easily storing logo data in a target printer. A data storage file for storing the logo data in the target printer is produced by creating the print data, generating a set of commands for storing the print data in the non-volatile storage of the target printer, compiling the data storage file containing the print data and command data set, and outputting the data storage file. When a host terminal accesses this data storage file, it runs the commands in the detected command data set, thereby sending a storage command data set to the target printer. The target printer then runs the storage commands and locally stores the logo data.

24 Claims, 9 Drawing Sheets

U.S. PATENT DOCUMENTS

| | | | |
|---|---|---|---|
| 5,428,748 A * | 6/1995 | Davidson et al. ............... 710/9 |
| 5,452,094 A * | 9/1995 | Ebner et al. ................. 358/296 |
| 5,467,196 A | 11/1995 | Fukushima et al. |
| 5,581,375 A | 12/1996 | Ma |
| 5,680,230 A | 10/1997 | Kaburagi et al. |
| 5,680,742 A * | 10/1997 | Hidding ........................ 53/411 |
| 5,740,333 A | 4/1998 | Yoh et al. |
| 5,757,893 A * | 5/1998 | Ishimoto et al. ......... 379/93.26 |
| 5,852,744 A * | 12/1998 | Agatone et al. ............... 710/17 |
| 5,894,792 A * | 4/1999 | Heinrich et al. ............... 101/91 |
| 6,007,261 A | 12/1999 | Fujita et al. |
| 6,038,636 A * | 3/2000 | Brown et al. ................ 711/103 |
| 6,154,227 A * | 11/2000 | Lund ........................... 347/14 |
| 6,188,493 B1 | 2/2001 | Esaki et al. |
| 6,206,504 B1 | 3/2001 | Payne |
| 6,331,897 B1 * | 12/2001 | Kumada ..................... 358/1.9 |
| 6,359,695 B1 | 3/2002 | Takahashi et al. |
| 6,367,992 B1 * | 4/2002 | Aruga et al. .................. 400/76 |
| 6,394,673 B2 * | 5/2002 | Horigane ..................... 400/76 |
| 6,433,884 B1 * | 8/2002 | Kawakami ................. 358/1.15 |
| 6,459,419 B1 | 10/2002 | Matsubayashi |
| 6,486,966 B1 | 11/2002 | Takahashi et al. |
| 6,490,053 B1 | 12/2002 | Takahashi et al. |
| 6,502,923 B2 | 1/2003 | Payne |
| 6,604,111 B1 * | 8/2003 | Hamzy ........................ 358/1.9 |
| 6,711,677 B1 * | 3/2004 | Wiegley ..................... 713/151 |
| 6,789,482 B2 * | 9/2004 | Yokoyama et al. .......... 101/483 |
| 2002/0048034 A1 * | 4/2002 | Matoba ..................... 358/1.13 |
| 2003/0160979 A1 * | 8/2003 | Tuchtenhagen ............. 358/1.6 |

FOREIGN PATENT DOCUMENTS

| | | | |
|---|---|---|---|
| JP | 61-250722 | | 1/1986 |
| JP | 61-208578 | | 9/1986 |
| JP | 62-88071 | | 4/1987 |
| JP | 63-060672 | | 3/1988 |
| JP | 63-172662 | | 7/1988 |
| JP | 63298578 | | 12/1988 |
| JP | 1-206052 | | 8/1989 |
| JP | 2-84364 | | 3/1990 |
| JP | 2-293921 | | 12/1990 |
| JP | 03121571 | | 5/1991 |
| JP | 4-190466 | | 7/1992 |
| JP | 4-264915 | | 9/1992 |
| JP | 05035573 | * | 2/1993 |
| JP | 06006600 | | 1/1994 |
| JP | 6-24046 | | 2/1994 |
| JP | 06-217048 | | 8/1994 |
| JP | 6-227078 | | 8/1994 |
| JP | 6-88427 | | 11/1994 |
| JP | 7-66974 | | 3/1995 |
| JP | 7-66975 | | 3/1995 |
| JP | 7-175613 | | 7/1995 |
| JP | 8-84268 | | 3/1996 |
| JP | 08-090767 | | 4/1996 |
| JP | 8-169142 | | 7/1996 |
| JP | 8-212023 A | | 8/1996 |
| JP | 8-230269 | | 9/1996 |
| JP | 8-282016 | | 10/1996 |
| JP | 9-66643 | | 3/1997 |
| JP | 9-135325 | | 5/1997 |
| JP | 9-200554 | | 7/1997 |
| JP | 09247470 | | 9/1997 |
| JP | 10-051770 | | 2/1998 |
| JP | 10-086461 | | 4/1998 |
| JP | 10134178 | | 5/1998 |
| JP | 410119384 | * | 5/1998 |
| JP | 10-148574 | | 6/1998 |
| JP | 10149441 | | 6/1998 |
| JP | 10164380 | | 6/1998 |
| JP | 11-69173 | | 3/1999 |
| JP | 11-070780 | | 3/1999 |

OTHER PUBLICATIONS http://javaalmanac.com/egs/javax.print/DiscoverAll.html.*
http://www.starmicronics.com/printers/printers_pages/support/manuals/TSP800UM.pdf.*
http://www.starmicronics/drv/download.php?id=10.*
Logo Store Printer Driver Specification and User Manual.*
"Post Office Site", http://www.joshuatreevillage.com/228/po.htm.
"Tech 316 and 550 Weekly Assignments", http://www.technology.ewu.edu./Tech316/ComGA1.htm.
Ithaca—Press Release, "Transact Technology's Color Inkjet Printer Provides New Marketing Opportunities", Apr. 17, 2000, 1 page.
Ithaca—Press Release, "Transact Unveils Color Inkjet Printer; Turns The World of POS Upside Down", Apr. 17, 2000, 1 page.
Ithaca—Press Release, "Transact's New POSjet Chosen For Peripheral Systems Techtour At Retail Systems 2000", Apr. 17, 2000, 1 page.
Ithaca—Press Release, "Transact's New Color InkJet POS Printer Meets Hospitality Industr Needs And Is Also A Brand Builder", Apr. 20, 2000, 1 page.
Ithaca—"How To Use The PJ1000 Image Converter", before Apr. 17, 2000, 12 pages.
1998 Adobe Systems, Inc., Adobe Photoshop 5.0 User Guide for Macintosh and Windows, pp. 63-133.

* cited by examiner

METHOD FOR GENERATING A PRINT DATA FILE, METHOD FOR STORING PRINT DATA, A DATA STORAGE MEDIUM THEREFOR, AND AN APPARATUS FOR GENERATING A DATA STORAGE FILE

This application claims the benefit of U.S. Provisional Application No. 60/317,795 filed Sep. 7, 2001 under 35 U.S.C. §119(e).

BACKGROUND OF THE INVENTION

1. Field of the Invention

The present invention relates to a method for storing print data in a printer that prints the stored data in response to a specific print command, a method for generating the print data file, a data storage medium embodying a computer program for implementing the steps of the method, and a file generator for compiling the data storage file.

2. Description of the Related Art

In addition to printing the name and price of the purchased products, as well as other transaction information, on sales receipts, modern POS terminals also commonly print a logo containing the store or company name on the receipts. Most such logos typically include a design graphic and decorative characters in the form of image data which is contained in image files.

Image files are typically rather large, which means there would be a noticeable increase in the time required to print each receipt if the logo data had to be sent to the printer each time a receipt is printed. This presents a problem since, it desirable to complete the checkout process, i.e., register the purchased products and print the receipt to complete the transaction, as quickly as possible. Fast printing is particularly desirable for a POS terminal.

Frequently printed logo data is therefore commonly stored in the non-volatile memory or storage of the POS terminal printer. The host system then only needs to send a specific command to the printer in order to print the logo. When the printer detects this command, it simply reads the logo specified by the print command from the non-volatile storage in order to print the logo. This technique eliminates the need to send the logo data (particularly image data) from the host, thus reducing the load on the host, eliminating the corresponding transmission time, and thereby significantly improving the effective print speed.

Modern POS printers are now capable of printing two or three colors. The ability to print multiple colors greatly increases the applications for which POS printers can be used beyond simply printing logos. Potential applications include, for example, printing product advertisements, event announcements, and coupons. Color images are also significantly larger than black and white images, and processing color images accordingly requires more time. The need to quickly print color images on a POS printer therefore makes it even more important to store the image data as logo data in the printer. As the number and variety of printing applications for a POS printer increases, storing the logo data in the printer will be increasingly more important.

As described above, the effective printing speed (throughput) can be improved and the processing load on the host can be alleviated by storing the logo data in non-volatile storage in the printer. However, after the logo data is generated various additional steps are needed in order to store the logo data in the printer's non-volatile storage.

Consider a POS printer connected to the host device of the POS terminal at a checkout station in a store. To store the logo data in the POS printer while the printer remains connected to the POS terminal, a logo storage program must be installed in the host device of the POS terminal. For example, the logo data (image information) is saved as a file. The logo storage program installed in the host then reads this file and stores the logo data to the printer. This requires reading the file, and sending the logo data and a store command to the POS printer. These steps are also necessary when the logo data file is sent to the POS terminal via a LAN or other network and the logo data is transferred from the POS terminal to the printer.

Installing such a logo storage program in each POS terminal is extremely time-consuming and cumbersome. It is alternatively possible to disconnect each POS printer from the POS terminal, and connect each printer to a dedicated logo data writer in order to store the logo data to the printer. This, however, requires that each printer be disconnected and then reconnected, which is even more time-consuming and further complicates the logo data storage operation.

OBJECTS OF THE INVENTION

The present invention is directed to solving these problems by providing a print data (logo data) storage method for storing logo data or other print data (including text data) in a printer without requiring installation of such a logo storage program in the host or POS terminal.

A further object of this invention is to provide a system and method for compiling and creating the data storage file used to store the logo or print data in the printer.

SUMMARY OF THE INVENTION

This invention solves the above problems by creating a data storage file containing the print data to be stored in a target printer and a command data set for storing the print data in the printer. A host terminal to which the target printer is connected reads this data storage file, and sends the command data set and the print data contained therein to the target printer. The target printer then stores the print data according to the command data set received from the host.

According to one aspect of the invention, a method is provided for storing print data in non-volatile storage in a target printer. The method comprises: (a) a step for creating the print data; (b) a step for creating a command data set for storing the print data in the non-volatile storage in the target printer; (c) a step for creating a data storage file containing both the print data and the command data set; and (d) a file output step for storing the data storage file in a data storage medium readable by a host device, or for sending the data storage file to the host device via a communication path; wherein the data storage file, when read by the host device, causes the host device to transmit the print data to the target printer for storage in the non-volatile storage therein.

The print data and commands for storing the print data in the target printer are thus contained in a single data storage file so that, when the host device simply accesses this data storage file and runs the embedded commands, the data is stored in the non-volatile storage of the printer. It is therefore not necessary to install a program in the host device specifically for writing logo data to the printer. Print data can be stored in a printer without installing such a special program in the host.

Preferably, the command data set includes a data storage command set, executable by the target printer, for storing print data in the non-volatile storage of the target printer. The data storage command set executed by the target printer is thus also embedded in the data storage file so that the host device simply reads the data storage file and sends the storage command data set to the target printer. The printer then runs the storage commands to easily store the print data in the printer.

The command data set may also include a command set, executable by the host device, for creating a data storage command set for storing print data in the target printer. In this case, the data storage command set does not directly include the logo data. Instead, commands are created so that when the host device accesses the data storage file, it creates from the logo data the data storage command set including the logo data sent to the printer. It is therefore not necessary to include a data storage command set for every target printer when the data storage file is initially compiled, and the host device can be used to set the specific parameters dependent on the target printer actually connected to the host.

Preferably, the command data set also includes a data transmission command set, executable by the host device, for sending the data storage command set and print data to the target printer. In this case, the host device can send the data storage command set by simply accessing the data storage file, and it is not necessary to use a separate communication control program.

The data transmission command set may contain parameters for connecting the host device with the target printer. By using an data file thus compiled the host can automatically store logo data to the target printer by simply accessing the data storage file.

The data transmission command set may further include an executable command set which, when run by the host device, detects communication parameters, and according to the detected communication parameters sends the data storage command set and print data to the target printer. It is therefore possible to send the storage command data set without requiring communication parameter input.

The data transmission command set may further include an executable command set which, when run by the host device, enables inputting communication parameters such as the communication settings, and enables setting the communication settings for sending the data storage command set to the target printer based on the input communication parameters.

The data storage file created by this aspect of the invention embeds the data transmission command set in the data storage file. It is therefore possible to send the storage command data set and print data to the target printer by simply inputting the target printer communication parameters to the host.

In accordance with another aspect, the invention includes a computer-readable data storage medium embodying a computer program for directing a computer to execute any of the above-described methods. Any known computer-readable data storage medium may be used including a compact disc, floppy disk, hard disk, magnetic tape, or electromagnetic carrier wave.

In yet another aspect, the invention involves an apparatus for creating an data storage file and for storing print data in non-volatile storage in a printer. Such an apparatus comprises an editor for creating print data; a command data set generator for creating a command data set for storing the print data created by the editor in the printer; a file generator for creating a data storage file containing both the print data and the command data set generated by the command data set generator; and an output device for storing the data storage file and writing the data storage file to a data storage medium or outputting the data storage file via a communication path.

Preferably, the command data set generator generates a data storage command set that is adapted to be executed by the target printer to store the print data, and the file generator combines the data storage command set and the print data to create the data storage file.

Preferably, the command data set generated by the command data set generator includes a data storage command set that is adapted to be executed by the target printer and a data transmission command set for sending the data storage command set to the target printer from the host device to which the target printer is connected, and the file generator combines the data storage command set, data transmission command set, and the print data to create the data storage file.

Preferably, the data transmission command set generated by the command data set generator includes an executable command set enabling input of communication parameter data including information regarding the target printer connection port and other settings when the host device opens the data storage file.

Preferably, the data transmission command set generated by the command data set generator includes an executable command set for detecting and obtaining communication parameter data including the target printer connection port and other settings when the host device opens the data storage file.

Other objects and attainments together with a fuller understanding of the invention will become apparent and appreciated by referring to the following description and claims taken in conjunction with the accompanying drawings.

DESCRIPTION OF THE PREFERRED EMBODIMENTS

This specification uses "logo data," "logo information," and simply "logo" in reference to data that is stored inside a printer and used to print information such as image data, graphic data, and text data, whether the data is for monochrome or color printing. Furthermore, except in rare cases, this logo data is usually image data or image information, although it may be a combination of image and text data or may consist only of text data. For convenience herein logo data stored in a printer is also referred to as "print data."

Preferred embodiments, along with various features and implementations, of the present invention are described below with reference to the accompanying figures. The following description is by way of example only. It will be apparent to one skilled in the related art from the following description that various alternative embodiments can be achieved by replacing one or more of the elements described below with a corresponding equivalent element. This invention encompasses all such variations that fall within the spirit and scope of the appended claims.

The preferred embodiments of the present invention are described below, by way of example, in the context of storing logo information in a printer used in a point-of-sale system (a POS printer), the type of printer that most frequently prints such logos. However, the present invention is not so limited. More broadly, this invention may be employed with any printer having the ability to store data for at least one logo and print the logo in response to a particular print command. Such printers include transaction receipt printers used in ATMs, parking lot ticket printers, and even customer number printers used to print queuing numbers in a store or bank.

The primary conventional use for POS printers has been to print transaction data; POS printers have therefore typically been monochrome printers. More recent POS printers, however, are also capable of color printing. However, such color POS printers are not full-color printers. Rather, for reasons relating to print speed and economy, such printers can only print using a few specific colors (such as red and black, for example).

Even if the printer can print only two colors, such as red and black, it is still possible to specify a number of gradations (256 gradations, for example). Extremely subtle, complex colors can therefore still be expressed by using gradients to express color density, and by variously combining the printable colors, say red and black, together with the non-printable color of the print medium (typically white). Even more complex, subtle color printing is possible if the printer can print three colors. Color POS printers make the POS system an even more effective business tool.

The primary purpose of the receipts printed by a POS printer is to provide the customer with an accurate record of a particular purchase, including details about the purchased products and the purchase price. When the transaction process is completed, the receipt is handed to the customer, who can then check the printed content to make sure there are no errors. Customers may also refer to the receipt after returning home in order to record the purchases in a home budget ledger. Receipts, which are individually handed to the customer and are often treated by the customer as a record containing important personal information, are fundamentally different from common flyers and advertisements. Receipts more readily attract the customer's attention than normal print advertisements. Thus, the printing of logos, pictures, photographs, and text messages in connection with advertisements, announcements, product/sales promotions, and other such information (collectively, advertising information) on the receipt has the potential of being particularly effective. Color image information in particular is an effective means of getting the customer's attention and tends to attract attention when the customer checks the receipt. Thus, printing color advertising information on receipts is likely to be an even more effective advertising and sales promotion technique.

POS systems having POS printers capable of printing image information such as that described above are more than simply systems for registering sales transactions because they can also be used as a product advertising and sales promotion tool. Use of such POS systems in the sales and distribution industry is therefore expected to grow significantly in the coming years. As logo printing is employed for a wider range of uses, however, the need to store or change the logo stored in the printer will also increase. It is therefore necessary to simplify the process used to store a logo in a printer.

A. Logo Printing

Figure 7:
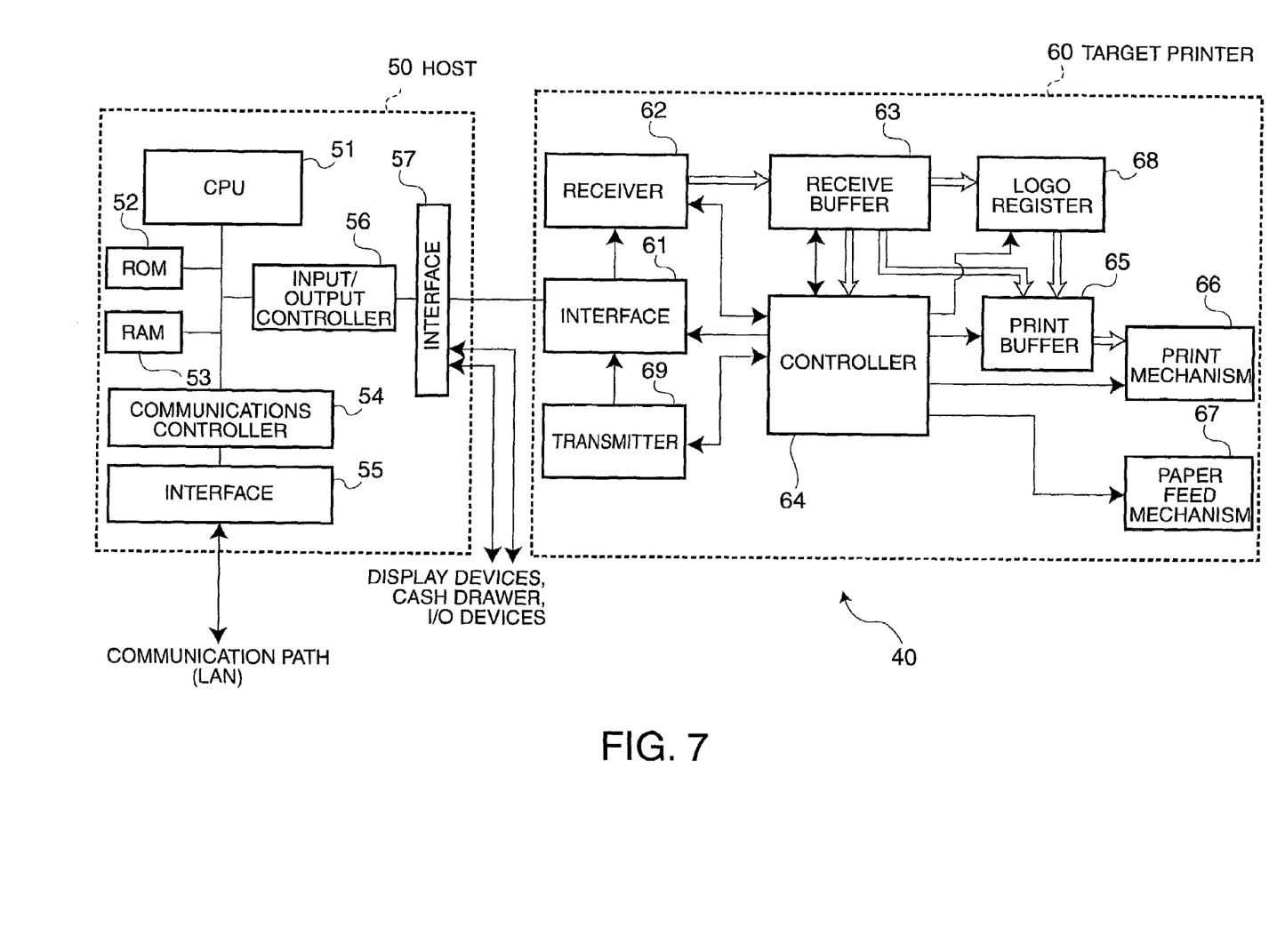
FIG. 7 is a functional block diagram of a host and a printer of the POS terminal.

How a logo is typically stored in a printer and then printed is described with reference to FIG. 7, which is a functional block diagram of a host 50 and printer 60 of a prior art POS terminal 40. The display, cash drawer, and other parts of the POS terminal 40 not related to logo printing are not shown in FIG. 7.

The host 50 controls overall operation of the POS terminal 40, and controls the overall process for registering purchased products and completing the transaction. The host 50 can be any general purpose computer running POS software. Thus, the host 50 can be configured using a CPU 51, ROM 52, RAM 53, communications controller 54, input/output controller 56, and interfaces 55 and 57. The host 50 is connected to the POS server (not shown in the figure) via a LAN or other communication path, retrieves product prices and other information from the POS server via interface 55 and communications controller 54, and runs the product registration and transaction process. The content of the product registration and transaction process is displayed on the operator display and customer display (not shown in the figure) by way of the input/output controller 56 and interface 57, and is printed on the receipt and journal paper (not shown in the figure) by the printer 60.

The printer 60 is connected by interface 61 to the host 50, and data sent from the host is received via interface 61 by the receiver 62. The received data is stored in receive buffer 63 in the order received, and usually is interpreted by controller 64 in the order stored. If an executable command is detected as a result of data interpretation, the command is executed; if print data is detected, the data is converted to printing pattern data and stored in print buffer 65. Color printers have a separate print buffer for each printable color, and store the print pattern data for each printed color. When a print command is executed, the data stored in print buffer 65 is transferred to the print mechanism 66 for printing. When a line feed command is detected, a paper feed mechanism 67 is driven to transport the printing paper (not shown in the figure). The print mechanism 66 includes the paper feed mechanism 67 and print head, as well as a carriage drive mechanism (also not shown) in the case of a serial printer. Various kinds of print heads can be used in a POS printer, including thermal heads, ink jet heads (including both ink jet heads driven with a piezoelectric element and bubble printer heads driven with a heat element), and dot impact heads.

Logo data is stored in the printer in response to a store logo command from the host 50. When the printer receives the store logo command and the logo data to be stored from the host, it stores the logo data to a particular address in the logo register 68, which is typically non-volatile memory. Conventionally, the logo data includes the company or store name, and trademark, if any. As demand for printing image information such as product advertisements and discount coupons on POS printers increases, the need to store image information containing pictures or photographs for advertising information, announcements, or coupons as logo data will also increase. Furthermore, the content of the advertisement, announcement, or other such information will also change from time to time, and the number of times the logo data must be stored after changing the logo data will likely increase significantly compared with conventional applications. When the logo is printed in color, color image information is also stored to the logo register 68.

Logo data is printed as a result of a print logo command from the host 50. When the printer receives a print logo command from the host, it reads and sends the logo data specified by the print logo command from the logo register 68 to the print buffer 65 to print the logo data on the receipt. It is therefore not necessary to send the logo data from the host to the printer each time logo data is printed, thus reducing the logo data transmission load on the host, eliminating the corresponding transmission time, and enabling faster printing.

Figure 8:
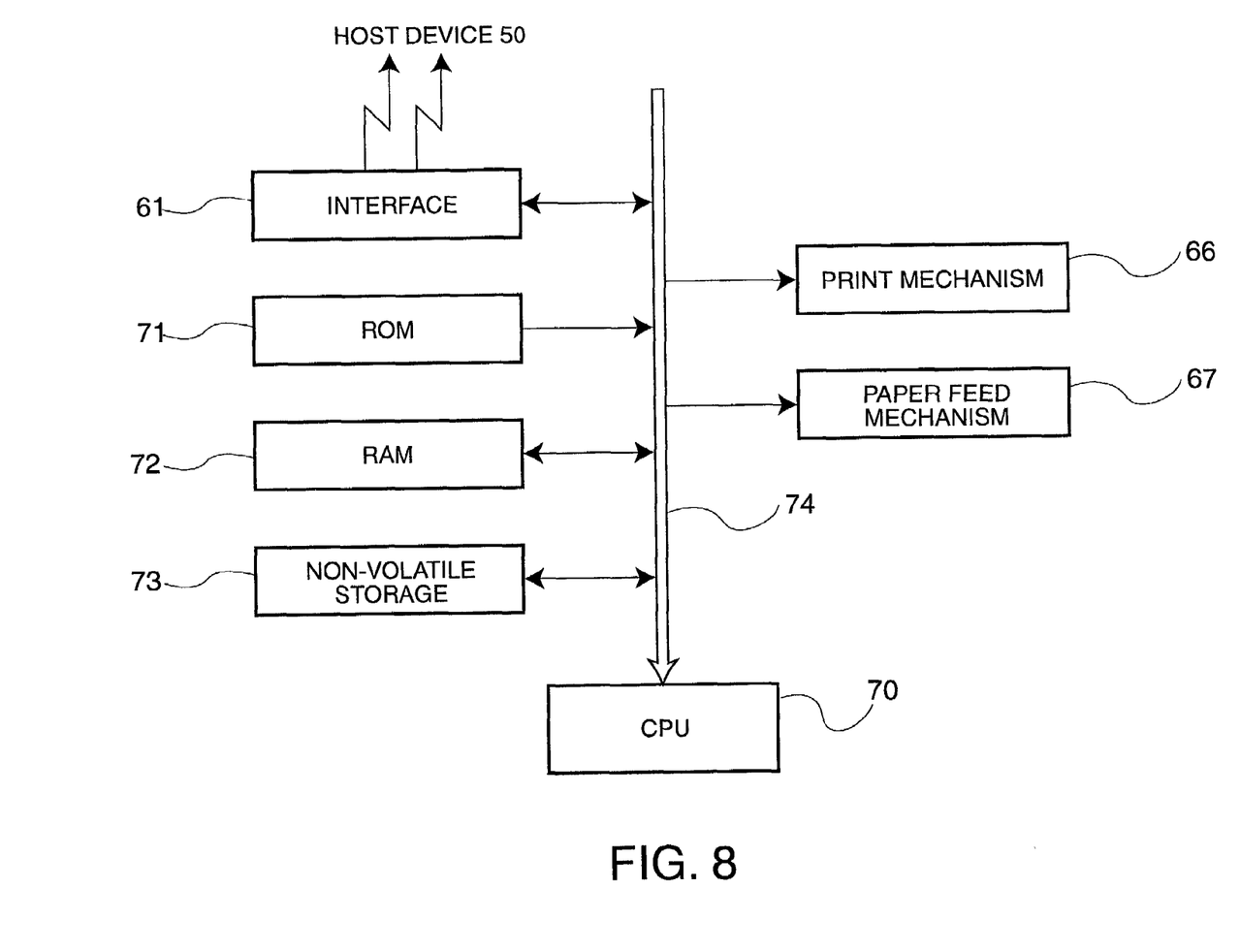
FIG. 8 is a block diagram showing the basic configuration of a printer configured using a CPU, ROM, RAM, operating system, and other control software.

As shown in FIG. 8, the printer 60 can be configured using a microprocessor or other type of CPU 70, ROM 71, RAM 72, non-volatile storage 73, an interface 61, printing mechanism 66, and transportation mechanism 67 connected to the CPU 70, and an operating system (OS) or other control program stored in ROM 71 or RAM 72. The receive buffer 63 and print buffer 65, for example, can be provided using designated areas in RAM 72, and flash memory or other type of non-volatile storage 73 can function as the logo register 68. Furthermore, if SRAM is used for RAM 72, a designated area in RAM 72 can be used for the logo register 68.

B. Overall Concept of the Process for Storing Logo Data in the Printer

Figure 9:
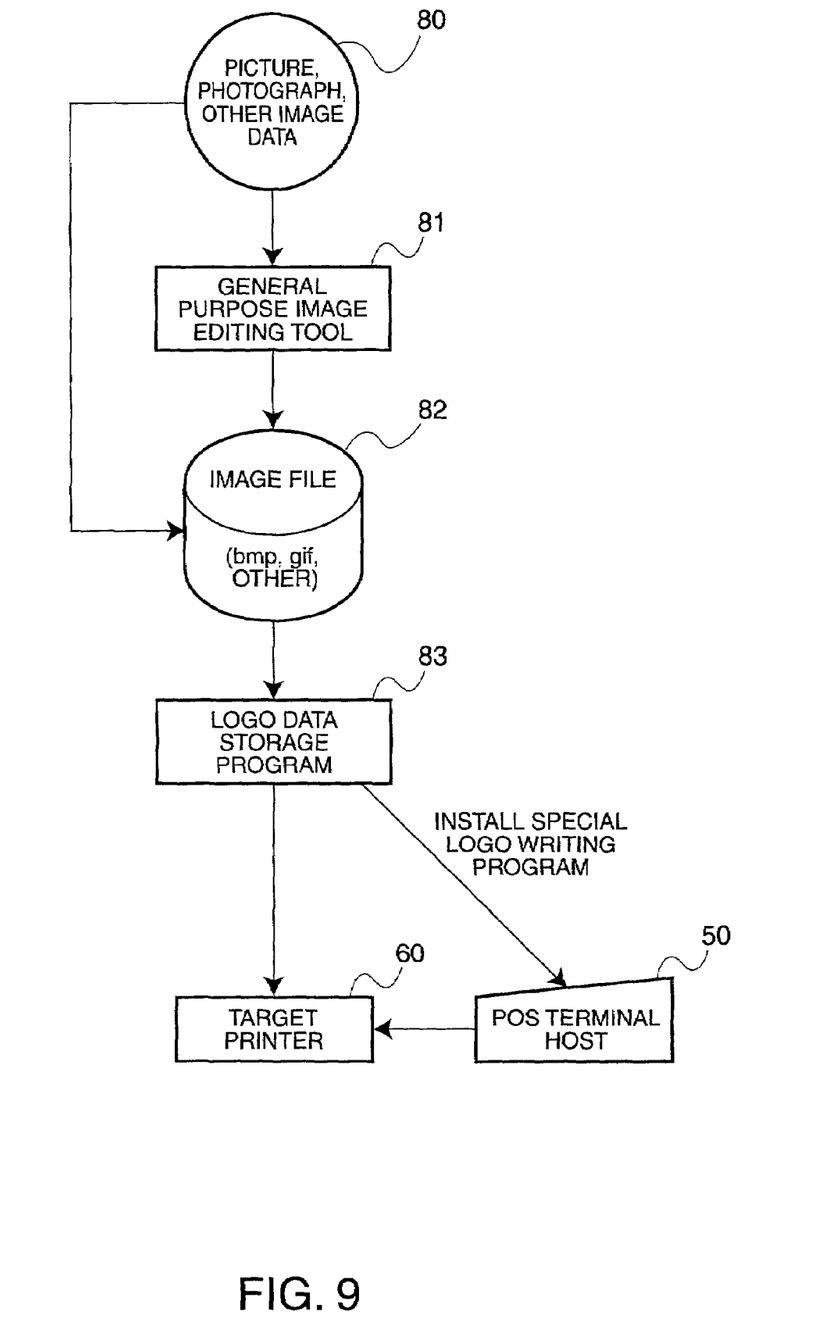
FIG. 9 schematically illustrates a conventional process from generating a logo to storing the logo in a printer.

The logo data storage process of the prior art is described first with reference to FIG. 9, which shows the concept of the prior art process from creating the logo data to storing the logo data in a printer.

Before the logo data can be stored in the printer, such logo data must first be defined. This can be accomplished by creating new logo data to be stored, or by using pre-existing image data for the logo data. To create new logo data, a general purpose image editing tool 81 is used to capture an existing graphic or picture 80, merge the graphic 80 with text, for example, and thus create a new image file 82. A file storing an image recorded with a digital camera, a photograph or picture captured with a scanner, or other image can be used as the image file 82.

To store logo data in the printer, a logo data storage program 83 run by a dedicated logo data writer sends a logo storage command and the logo data to the printer in which the logo data is to be stored, that is, to the target printer 60. The target printer controller 64 interprets and executes the received data storage command set to store the received logo data (print data) in the logo register 68 (FIG. 7). A special logo data storage tool has conventionally been used to thus store logo data in the printer, and when the storage tool is installed to a dedicated logo data writer, the printer 60 in which the logo data is stored must be connected to the logo data writer. In supermarkets or department stores where a large number of POS terminals are used, disconnecting the POS printer from each POS terminal and connecting it directly to the logo data writer is extremely cumbersome.

Another method is to install a logo data storage program in the host 50 and write the logo data from the host to the printer. This method also requires installing the storage program in each POS terminal, a process which is also cumbersome. Furthermore, when the logo data is frequently updated, this method does not make it easy to store the updated logo data to each printer.

Figure 2:
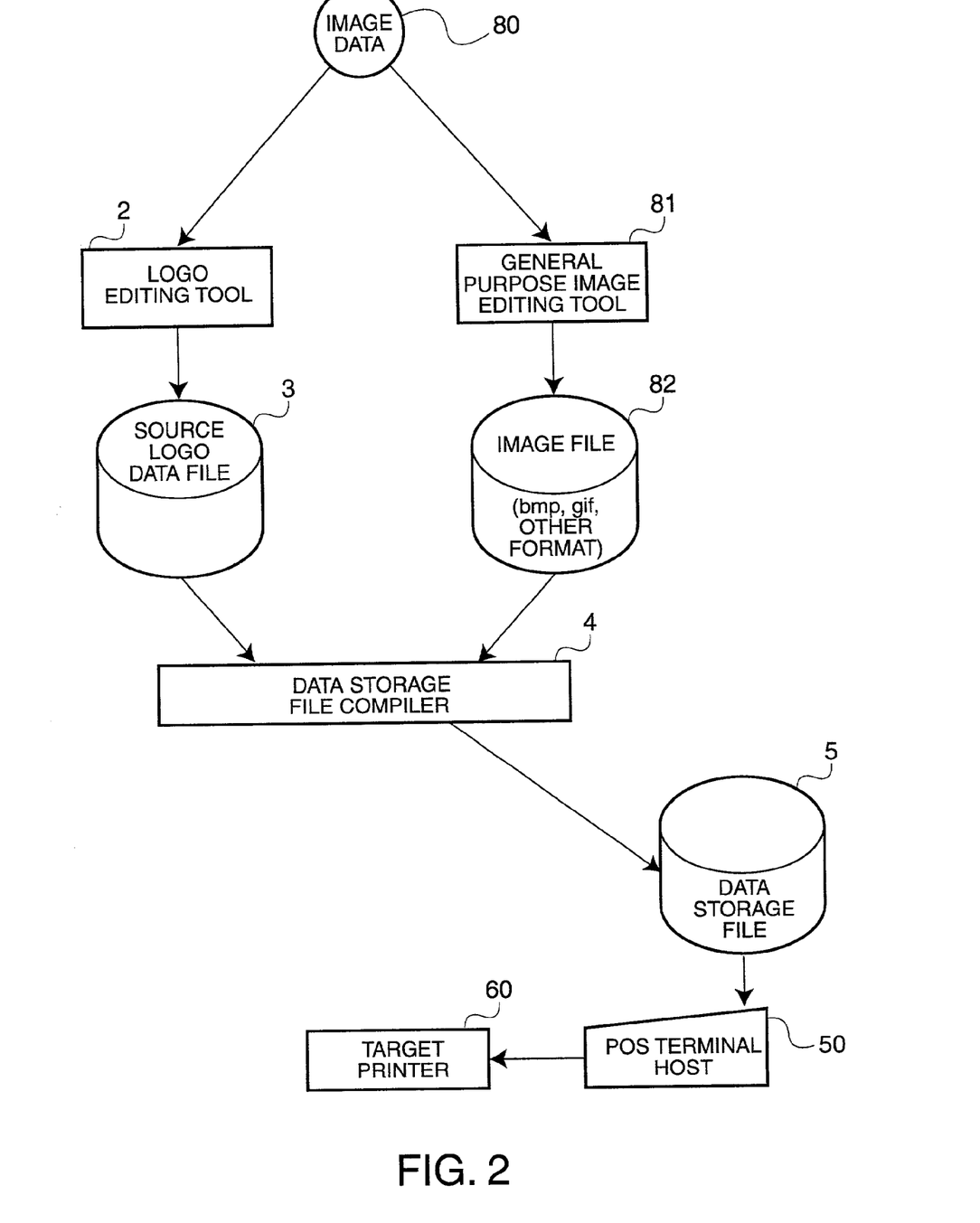
FIG. 2 schematically illustrates a process from generating a logo to storing the logo in a printer according to the present invention.

The method, according to the present invention, for storing logo data in a printer is described next with reference to the practical example shown in FIG. 2. FIG. 2 shows the concept of the overall process from creating the logo data to storing the logo in the printer using the method of this invention.

Before logo data can be stored in the printer such logo data must first be created. To create a new logo, an existing picture, photograph, or other image data 80 is captured using a logo editing tool 2; text is then added and other images are merged as appropriate to create the source logo data. The resulting source logo data is then stored in a source logo data file 3. The logo editing tool 2 is used to create a new logo for logo printing. Coupons, corporate or store logos, or product advertisements must be created for a particular printing purpose. Creating the source logo data using the logo editing tool 2 is a process of capturing or creating the text data, pictures, photographs or other graphic data used as the basis for creating the best logo for the purpose, and then appropriately combining these elements.

If existing image data is used as is without further editing, a general purpose image editing tool 81 can be used to capture the photograph, image, or other image data from a digital camera or scanner, for example, and create the image file 82 that is then used as the logo data. If an existing image file 82 is thus used as is, it is not necessary to use the logo editing tool 2. Image data to be used as the basis for logo data created using either of these methods is referred to herein as the source logo data.

A data storage file compiler 4 then adjusts the source logo data colors, resolution, size, and other parameters to match the width of the printing paper used by the target printer in which the logo data is stored, the print resolution, and the number of printable colors. The result of adjusting the colors (by a color reduction process, for example), size, and resolution of the source logo data is the logo data to be stored in and printed by the target printer. As noted above, this logo data may be variously referred to herein as a logo, logo data, logo information, or print data.

Our invention then creates a data storage file 5, that is, a file containing image, graphic and/or text data with embedded commands, by adding a command set to the logo data for storing it in the printer. The host 50 is then able to read this data storage file 5 and execute the embedded command set to store the logo data to the target printer 60 without having a logo data storage tool (program) installed in the host.

C. Data Storage File Compiler

Figure 1:
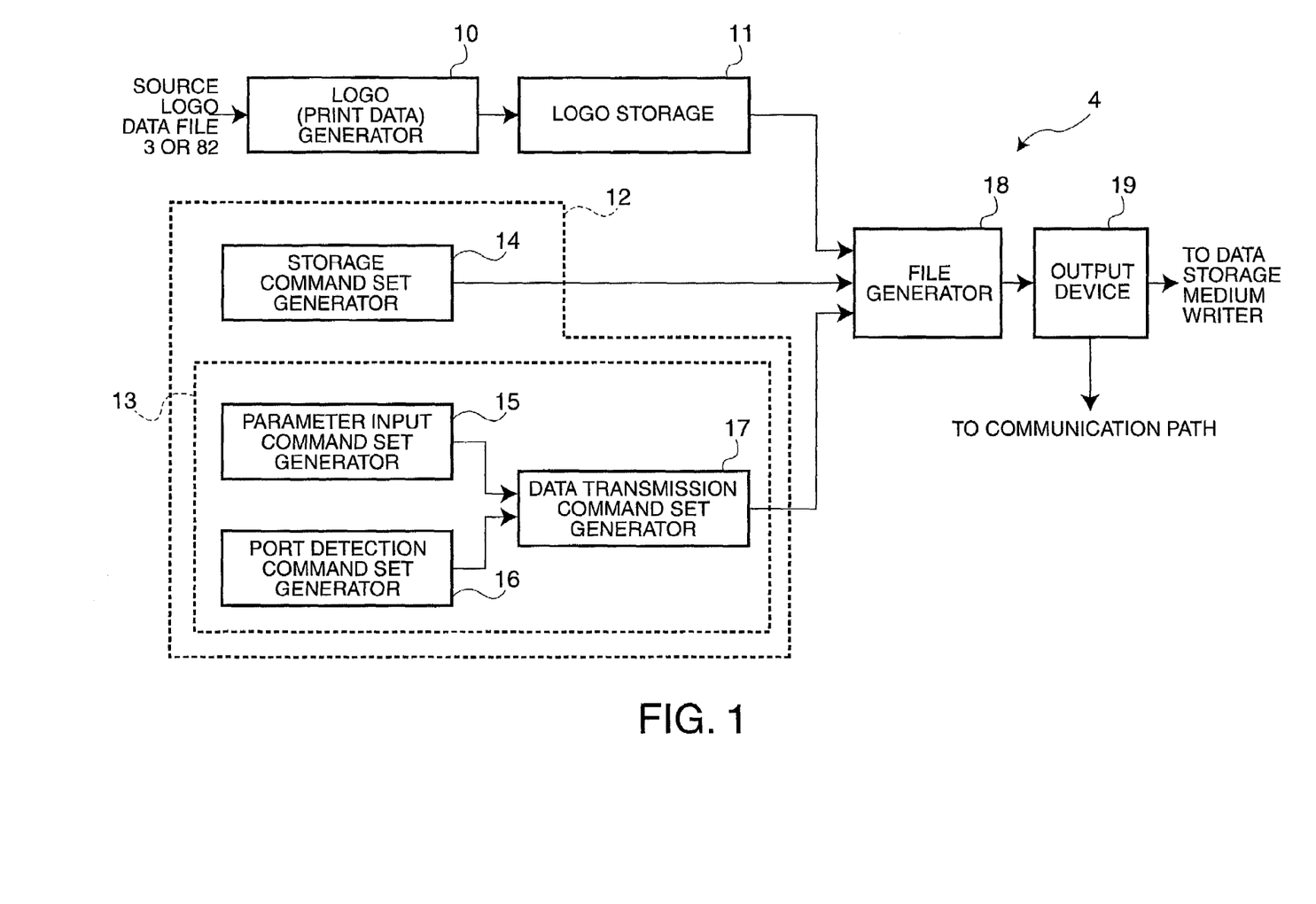
FIG. 1 is a functional block diagram showing the basic configuration of an data storage file compiler according to a first embodiment of the present invention.

FIG. 1 is a functional block diagram showing the basic configuration of a data storage file compiler 4 according to a preferred embodiment of the present invention.

Data storage file compiler 4 receives a source logo data file or image file that is generated by the logo editing tool 2 or general purpose image editing tool 81, respectively. As shown in FIG. 1, data storage file compiler 4 has a logo generator (also referred to as a print data generator) 10, logo storage 11, command set generator 12, data storage file generator 18, and output device 19. The data storage file compiler 4 produces the data storage file with which the host 50 stores the logo data in a target printer.

The logo generator 10 creates the logo data (print data) from the source logo data file 3 or image file 82, and stores the logo data in logo storage 11. The logo generator 10 executes the processes for reducing the colors of the source logo data to the printable colors of the target printer and adjusting the size and print density of the logo to the width of the print medium and the resolution of the target printer. The logo generator 10 has an image processing function capable of producing logo images that are aesthetically appealing and conform to the capabilities of the target printer. The image data resulting from this image processing operation is stored in the logo storage 11 as the logo data.

The data storage file compiler 4 also has a command set generator 12 which generates a set of commands for storing in the target printer the logo data output by the logo generator 10. The command set generator 12 has a storage command set generator 14 and a transmission command set generator 13. The data storage command set is a set of commands that can be executed by the printer 60 to store the logo data in the printer 60. The data transmission command set is a set of commands executable by the host 50 for sending the data storage command set to the printer. The data storage command set is therefore generated according to the system of commands that can be executed by the printer 60 in which the logo data is stored (that is, the printer command language), and the data transmission command set is generated according to the system of commands that can be executed by the host 50 to which the target printer is connected (that is, the host command language).

The transmission command set generator 13 of this embodiment, in turn, has a parameter input command set generator 15, a port detection command set generator 16, and a data transmission command set generator 17 for generating the data transmission command set to send the data storage command set and logo to the target printer. The parameter input command set generator 15 generates a command set that when executed by the host 50 receives input from the printer 60 indicating the printer port and communications parameters. The printer port and other communications conditions can be input when the host 50 runs this command. The port detection command set generator 16 generates a command set that when run by the host automatically detects the port to which the printer 60 is connected and the communications parameters.

The data transmission command set generator 17 generates the data transmission command set that, when run by the host 50, sends the data storage command set including the logo data from the host 50 to the target printer 60. The data transmission command set generator 17 can also be configured to automatically set the target printer 60 port and communications parameters when the data storage file compiler 4 generates the data transmission command set. In this case the parameter input command set generator 15 and port detection command set generator 16 do not need to generate the corresponding command sets. The data transmission command set generator 17 can be further configured to set the parameters based on parameter input from an input source not shown in the figure, or by referencing a lookup table (not shown in the figure) based on the input model of the target printer to find the appropriate parameters.

It should be noted that the command set generator 12 requires the storage command set generator 14, but the transmission command set generator 13 is optional. Furthermore, when the transmission command set generator 13 is included, the parameter input command set generator 15 and port detection command set generator 16 are optional.

The data storage file generator 18 (simply the file generator 18 below) then combines the logo data (print data), data storage command set, and data transmission command set to generate the data storage file 5 (FIG. 2) containing both the logo data and a set of commands for storing the logo data in the target printer. This data storage file could be generated as a single file, or as a set of multiple linked files. It should also be noted that what specific command sets are included in the data storage file can also be determined by a controller not shown in the figures.

The data storage file output from the file generator 18 is then sent by the output device 19 over a communication path to the host device of the POS terminal to which the target printer is connected, or is written to a floppy disk, a memory card, or other suitable storage medium (not shown in the figure). When the host 50 (FIG. 7) reads the data storage file sent by way of the communication path or from the storage medium, the host automatically executes the executable commands embedded in the data storage file, and thus stores the logo data in the printer.

It is therefore possible to store logo data in the target printer without installing a special program in the host 50.

Similar to the configuration of the target printer 60 described with reference to FIG. 8, the data storage file compiler 4 can be realized using a microprocessor or other CPU, ROM and RAM connected to the CPU via a bus line, and an operating system or other control program stored in the ROM or RAM. Thus, a CPU, ROM and RAM operating in conjunction with the stored control program may be used to implement elements 10, 11, 12, 13, 18, 19 shown in FIG. 1 and described above.

The data storage file compiler 4 of this invention can also be realized by a computer program embodied on a compact disc, floppy disk, hard disk, magnetic tape, or other data storage medium and adapted to be installed and run on a computer for implementing the functions of the compiler 4. Such computer program and data storage medium on which it may be stored are therefore also included in the scope of the present invention. Similarly, a computer program for carrying out the steps of the data storage file compiling process or the data file storage process described below, and a data storage medium recording such programs, are also included in the scope of the present invention. It should be noted that, in addition to physical elements, the data storage medium also includes any suitable electromagnetic signal on which a computer program can be carried.

D. Data Storage File Compiling Process

Figure 3:
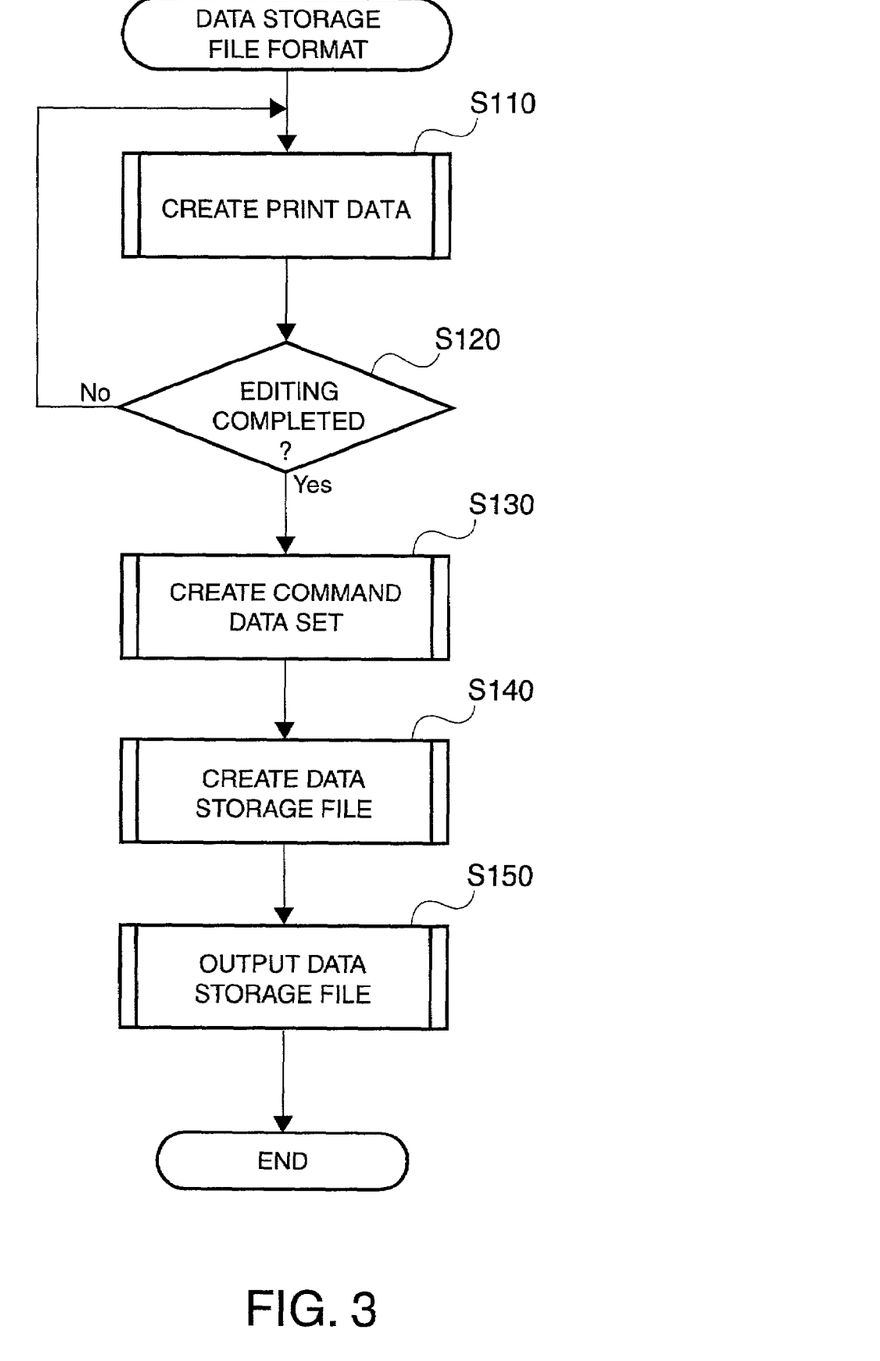
FIG. 3 is a flow chart showing a process for generating a data storage file.

An exemplary process for compiling the data storage file of this invention is described next below using flow charts. FIG. 3 is a flow chart showing the basic steps in the data storage file compiling method according to a preferred embodiment of this invention.

First, the logo generator 10 generates the print or logo data (S110), and then confirms if generating/editing the print data is finished (S120). If not (S120 returns no), the procedure waits for the print data to be completed (S110 and S120 repeat). When the logo data is completed (S120 returns yes), the command data set is created (S130), and the logo data and command data set are combined to create the data storage file 5 (S140). The resulting data storage file 5 is then transferred to the host 50 of the target printer using a data communication path, or a floppy disk or other data storage medium (S150).

Figure 4:
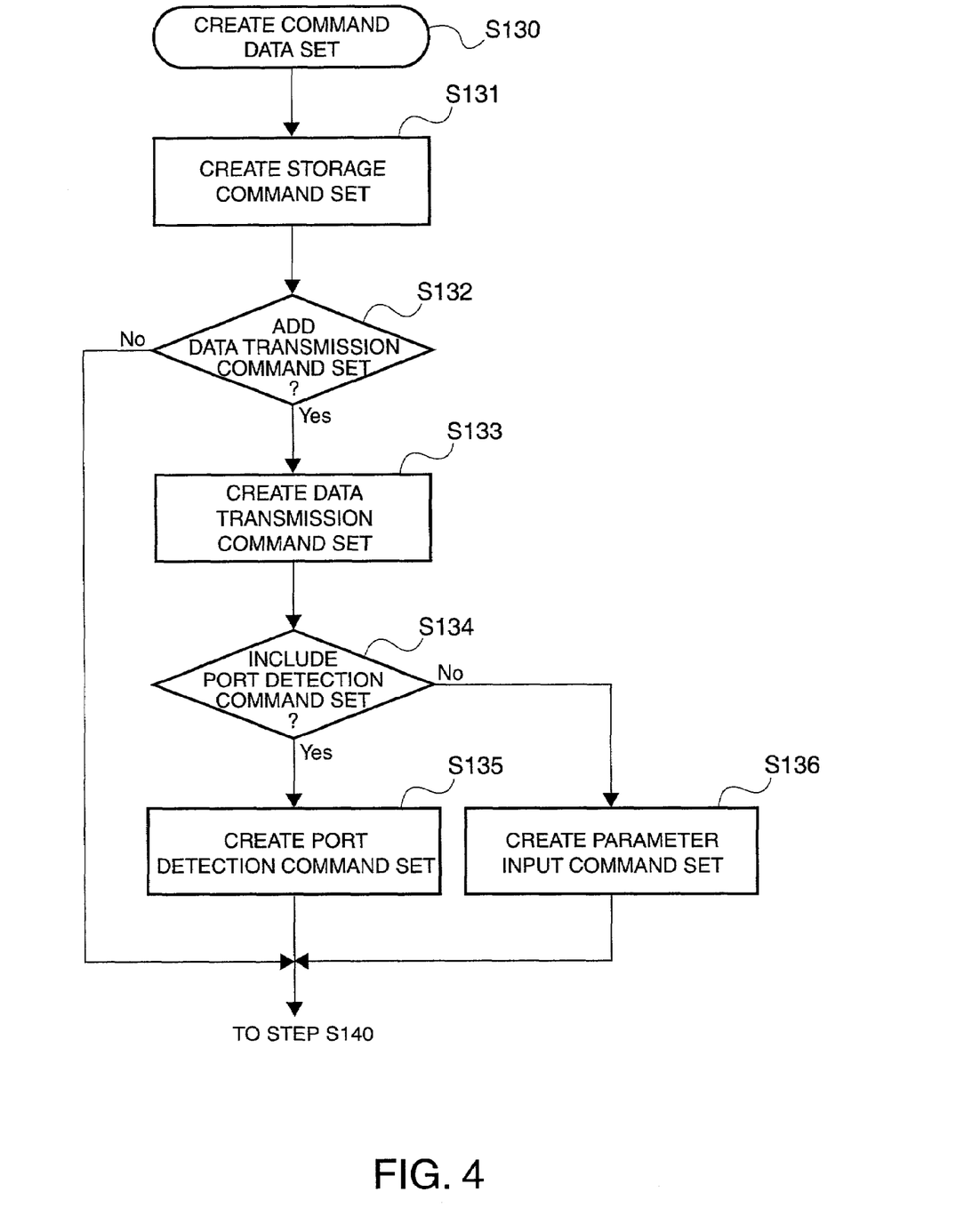
FIG. 4 is a flow chart showing in detail a subroutine for generating the command data set (S130 in FIG. 3)

FIG. 4 is a flow chart showing the command data set generating step (S130 in FIG. 3) in detail. When creating the print data is completed (S120 in FIG. 3 returns yes), the data storage command set is generated (S131). The data storage command set is a set of commands run by the target printer 60 to store the logo data in non-volatile memory inside the printer.

Consider the following command set:

GS(L pl ph 67 kc1 kc2 b xl xh yl yh [c d1dk]1[c d1dk]

which is as an example of a specific data storage command data set generated in step S131.

In this example "GS(L pl ph 67" is a command executed by the target printer to store the logo data in the logo register 68, a non-volatile storage medium.

"pl ph" defines the length of the following data. The data length is calculated as (pl+ph×256). Note that in this example both pl and ph are 255 or less, and the command can therefore specify a maximum data length of 65535 (=255+255×256).

"kc1 kc2" is a key value (numeric or symbol) uniquely identifying the logo data stored in the logo register 68. This value is used to recall the logo data for printing or deletion.

"b" indicates the number of colors that the target printer can print. If the printer can print black and red, that is, two colors, for example, "b" stores a symbol or value indicating the printer can print in two colors.

"xl xh" indicates the horizontal dot count of the logo data, and "yl yh" indicates the vertical dot count.

"[c d1dk]l[c d1dk]b" indicates the state of the dots of each of the colors from 1 to b. For example, if the target printer is a two color printer printing black and red, "[c d1dk]1" declares the state of each first color dot (black in this example; d1 . . . dk declaring the state of each block dot), and "[c d1dk]b" declares the state of each "b" color dot, that is, each red dot in this example. As a result, the storage command data set contains a bit map for each color in the logo data.

Note that in the storage command data set described above the logo data is embedded in the storage command data set using parameters "[c d1dk]1[c d1dk]b." It should be noted, however, that when the data storage file is compiled "GS(L pl ph 67 kc1 kc2 b" could be created as the data storage command set, and the print data (logo data) could be stored separately from the data storage command set. In this case the bit sequence "xl xh yl yh [c d1dk]1[c d1dk]b" of the logo data following the storage command data set could be generated when the data is sent from the host to the target printer to complete the storage command data set.

After the data storage command set is completed (S131), it is determined whether the data transmission command set is to be added to the executable command set (S132). The system can be configured so that adding the data transmission command set is optional. If the data storage file is sent directly from the logo generator 10 (FIG. 1) to the target printer, the data transmission command set is not necessary.

If the data transmission command set is not added (S132 returns no), the remaining steps are skipped and control advances directly to step S140 in FIG. 3. If the data transmission command set is added (S132 returns yes), the data transmission command set is generated (S133). As described above, the data transmission command set is a set of commands for sending the logo data and data storage command set from the host 50 to the target printer 60. This enables the host 50 to send the data storage command set and logo data to the target printer 60 automatically when the data storage file is read or by simply specifying the port number and other specific parameters.

When the data transmission command set is completed, it is determined whether to include a port detection command set in the data transmission command set (S134). If the port detection command set is not included, the target printer 60 port number and communication parameters must be input during the logo data storage operation. If the port detection command set is included (S134 returns yes), the port detection command set is created (S135). If it is not necessary to include the port detection command set (S134 returns no), a parameter input command set for entering the parameters is created (S136).

Figure 5:
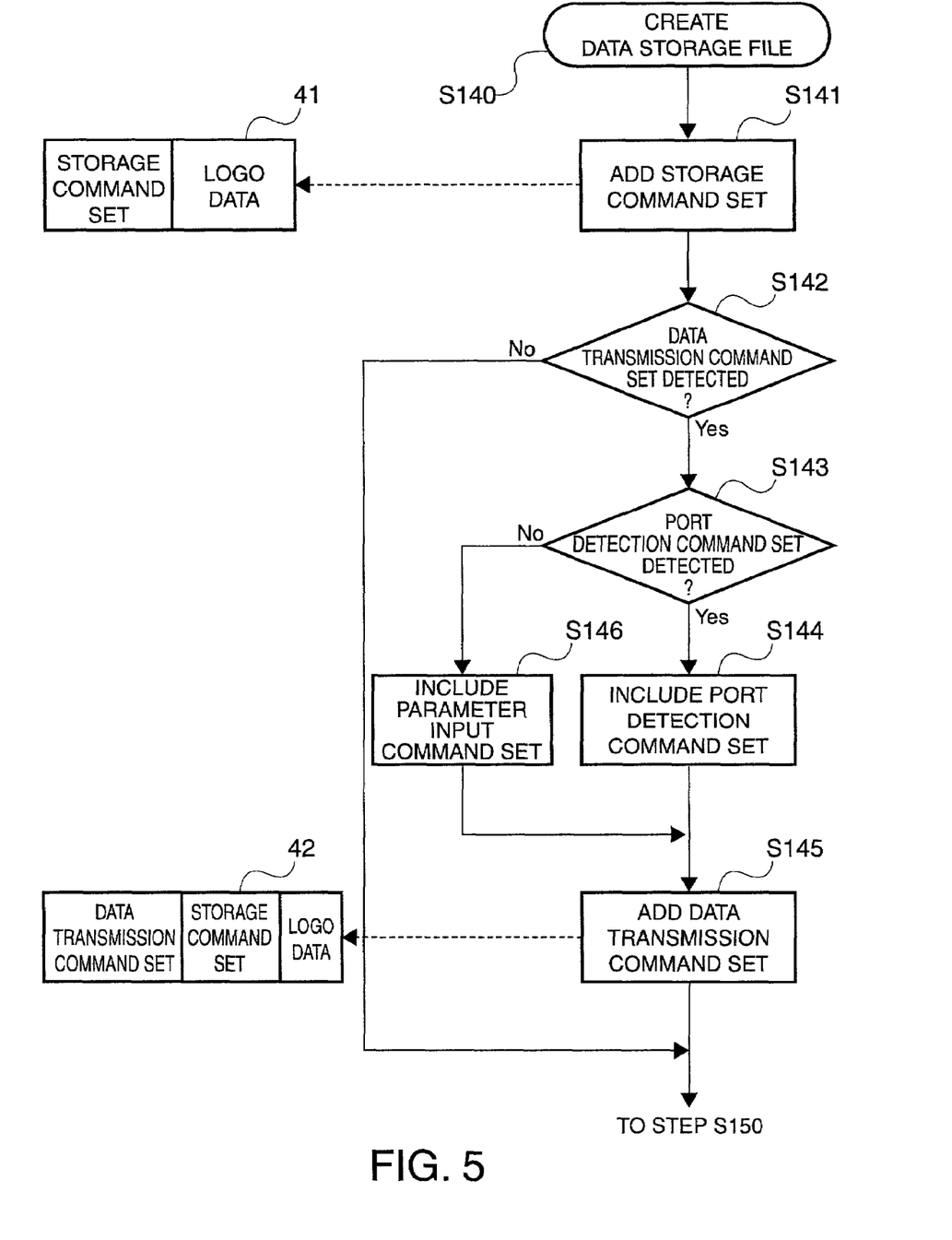
FIG. 5 is a flow chart showing in detail a subroutine for generating the data storage file (S140 in FIG. 3)

FIG. 5 is a flow chart showing details of the step (S140 in FIG. 3) for compiling the data storage file. The data storage file compiling step (S140 in FIG. 5) is executed after the command data set is completed (S130 in FIG. 3). The first step in this data storage file compiling operation is to create a file 41 containing the logo data (print data) and the data storage command set (S131 in FIG. 4) passed from the command data set generating routine. Combining these two elements is indicated to the left of step S141. The logo data can be stored in the printer by sending this file 41 containing the data storage command set and logo data from the host 50 to the target printer 60.

It is then determined in S142 whether the data transmission command set was generated in the command data set generating routine (S130). If it was not (S142 returns no), the merged file 41 from step S141 is output as the data storage file 5. If the data transmission command set was also generated (S142 returns yes), S143 determines if the port detection command set is also present. If the port detection command set was also passed (S143 returns yes), the port detection command set is combined with the data transmission command set (S144). If the port detection command set was not received (S143 returns no), the parameter input command set is combined with the data transmission command set (S146). A file 42 combining the appropriate data transmission command set is then merged with the file 41 generated in step S141, and is output as the data storage file.

If the port detection command set is incorporated in the data transmission command set in file 42, the port detection commands are run to automatically detect the communication parameters and port to which the target printer 60 is connected when the host 50 reads the data storage file, and the data storage command set and logo data are then sent automatically from the host to the printer.

If the parameter input command set is included in the data transmission command set of the file 42, the parameter input commands are executed when the host 50 reads the data storage file so that the port and other communication parameters can be input from the host 50. Once the parameters are defined, the data storage command set and logo data are transferred to the specified port and sent to the target printer 60.

E. Logo Editing Tool

The logo editing tool is described next with reference to FIG. 6, which is a functional block diagram showing an exemplary logo editing tool 2. The logo editing tool 2 is used to create the basic layout of an effective logo image optimized for the particular advertisement, announcement, or other printing objective. The logo editing tool 2 can create the logo by combining graphic images and text, and the resulting logo is stored as a logo file. A logo editing tool 2 in this example has an image reader 31, image data storage 32, image processor 33, text editor 34, image and text synthesizer 35, and source logo data storage 36. The image reader 31 reads image data or text data and stores it in the image data storage 32. The image data may be graphic data stored as an image file read from a magnetic disk, CD-ROM, or other storage medium, or it may be captured from a digital camera, scanner, or other data input source. The graphic data may be a photographic image, graphic animation, geometric diagram, decorative text, or various shapes. The image data storage 32 can store multiple images separately. The image reader 31 is preferably compatible with various graphic and image file formats so that it can read as many different types of image files as possible.

The image data stored in image data storage 32 is then processed by the image processor 33 to adjust the size and other image parameters as necessary. In addition to editing graphical image data, it is also preferable to be able to use a text editor 34 to create and edit text data. Designating specific colors for the text is therefore also preferable. The ability to create and edit text allows advertising slogans, announcements, and other textual information to be included in the logo.

The image and text synthesizer 35 merges the captured image information, image-processed image data, and/or text to create the desired logo. The image and text synthesizer 35 combines plural image and text elements to create the desired source logo data. Factors that can be used to combine images and text include selecting the specific image and text elements, and specifying the size and position of each image and text element relative to the overall logo. The source logo data merged by the image and text synthesizer 35 is preferably stored in the source logo data storage 36 in a metafile or similar format so that the various elements in the logo can be separated and re-edited as desired at a later time.

Figure 6:
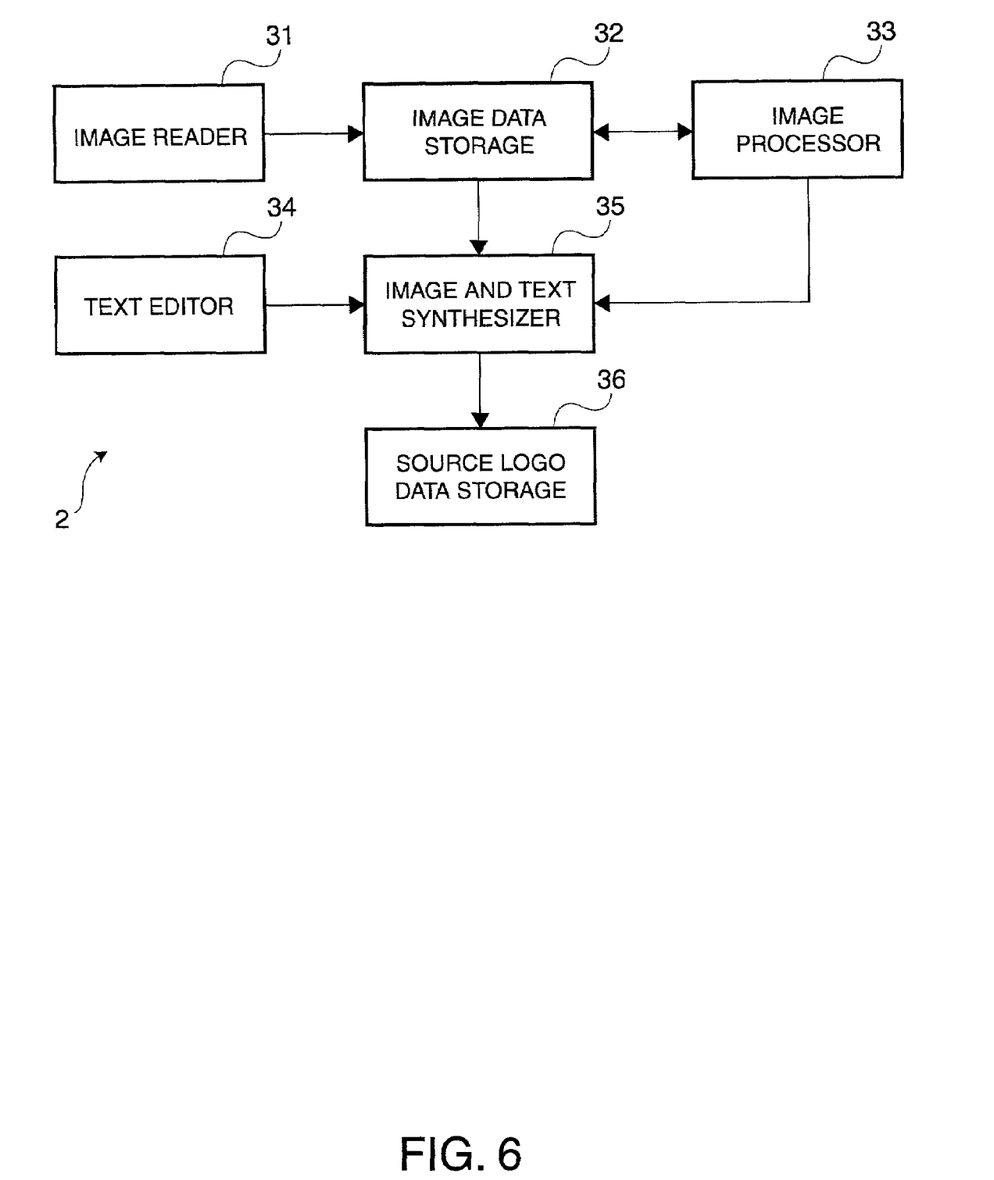
FIG. 6 is a functional block diagram showing a first example of a logo editing tool.

It should be noted that, while the image processor 33 and the image and text synthesizer 35 are shown as separate functional blocks in FIG. 6, the functions of these elements could be combined in a single block for editing element size and other parameters appropriately during the synthesis process.

If the captured source image is a full color image, for example, the logo editing tool 2 can be configured to reduce the image to a specified number of colors so that the source logo data is stored using only a specified number of printable colors.

Our invention creates a data storage file containing both a command data set and the print data (logo data), sends this data storage file via a communication path to a host 50 or causes the host to read the data storage file from a floppy disk or other data storage medium, so that the host 50 executes the command data set in the data storage file to store logo data in a target printer without requiring installation of a special program for storing the logo data. By enabling and causing the host to store logo data in a printer as a result of reading a file, this invention flexibly addresses a wide range of logo printing needs.

While the invention has been described in conjunction with several specific embodiments, many further alternatives, modifications, variations and applications will be apparent to those skilled in the art that in light of the foregoing description. Thus, the invention described herein is intended to embrace all such alternatives, modifications, variations and applications as may fall within the spirit and scope of the appended claims.

What is claimed is:

1. A method for storing print data in non-volatile storage in a target printer, comprising:
   (a) a step for creating the print data;
   (b) a step for creating a command data set for storing the print data in the non-volatile storage in the target printer;
   (c) a step for creating a data storage file containing both the print data and the command data set; and
   (d) a file output step for storing the data storage file in a data storage medium readable by a host device, or for sending the data storage file to the host device via a communication path;
   wherein the print data is stored in non-volatile storage in the target printer in accordance with the command data set upon the host device reading the data storage file.

2. A method as described in claim 1, wherein the command data set includes a data storage command set, executable by the target printer, for storing the print data in the non-volatile storage of the target printer.

3. A method as described in claim 2, wherein the command data set includes a data transmission command set, executable by the host device, for sending the data storage command set and the print data to the target printer.

4. A method as described in claim 3, wherein the data transmission command set comprises communication parameters for connecting the host device with the target printer.

5. A method as described in claim 4, wherein the data transmission command set includes an executable command set which, when run by the host device, detects the communication parameters, and sends the data storage command set and print data to the target printer according to the detected communication parameters.

6. A method as described in claim 4, wherein the data transmission command set includes an executable command set which, when run by the host device, enables inputting the communication parameters including communication settings, and enables setting the communication settings for sending the data storage command set to the target printer based on the input communication parameters.

7. A method as described in claim 1, wherein the command data set includes a command set, executable by the host device, for creating a data storage command set for storing the print data in the non-volatile storage of the target printer.

8. A method as described in claim 7, wherein the command data set includes a data transmission command set, executable by the host device, for sending the data storage command set and the print data to the target printer.

9. A method as described in claim 1, wherein the command data set includes a command set, executable by the host device, for creating a data storage command set, executable by the target printer, for storing the print data in non-volatile storage of the target printer.

10. A computer-readable data storage medium embodying a program of instructions for directing a computer to execute a method for storing print data in non-volatile storage in a target printer, comprising:
    (a) instructions for creating the print data;
    (b) instructions for creating a command data set for storing the print data in the non-volatile storage in the target printer;
    (c) instructions for creating a data storage file containing both the print data and the command data set; and
    (d) instructions for storing the data storage file in a data storage medium readable by a host device, or for sending the data storage file to the host device via a communication path;
    wherein the print data is stored in non-volatile storage in the target printer in accordance with the command data set upon the host device reading the data storage file.

11. A computer-readable data storage medium as described in claim 10, wherein the command data set includes a data storage command set, executable by the target printer, for storing the print data in the non-volatile storage of the target printer.

12. A computer-readable data storage medium as described in claim 11, wherein the command data set includes a data transmission command set, executable by the host device, for sending the data storage command set and the print data to the target printer.

13. A computer-readable data storage medium as described in claim 12, wherein the data transmission command set comprises communication parameters for connecting the host device with the target printer.

14. A computer-readable data storage medium as described in claim 13, wherein the data transmission command set includes an executable command set which, when run by the host device, detects the communication parameters, and sends the data storage command set and print data to the target printer according to the detected communication parameters.

15. A computer-readable data storage medium as described in claim 13, wherein the data transmission command set includes an executable command set which, when run by the host device, enables inputting the communication parameters including communication settings, and enables setting the communication settings for sending the data storage command set to the target printer based on the input communication parameters.

16. A computer-readable data storage medium as described in claim 10, wherein the command data set includes a command set, executable by the host device, for creating a data storage command set for storing the print data in the non-volatile storage of the target printer.

17. A computer-readable data storage medium as described in claim 16, wherein the command data set includes a data transmission command set, executable by the host device, for sending the data storage command set and the print data to the target printer.

18. A computer-readable data storage medium as described in claim 10, wherein the data storage medium comprises a compact disc, floppy disk, hard disk, or magnetic tape.

19. A computer-readable data storage medium as described in claim 10, wherein the command data set includes a command set, executable by the host device, for creating a data storage command set, executable by the target printer, for storing the print data in non-volatile storage of the target printer.

20. An apparatus for creating a data storage file and for storing print data to non-volatile storage in a printer, comprising:
   an editor for creating print data;
   a command data set generator for creating a command data set for storing the print data created by the editor in the printer;
   a file generator for creating a data storage file containing both the print data and the command data set generated by the command data set generator; and
   an output device for storing the data storage file and writing the data storage file to a data storage medium or outputting the data storage file via a communication path,
   wherein the print data is stored in non-volatile storage in the target printer in accordance with the command data set upon the host device reading the data storage file.

21. An apparatus as described in claim 20, wherein the command data set generator generates a data storage command set that is adapted to be executed by the target printer to store the print data, and wherein the file generator combines the data storage command set and the print data to create the data storage file.

22. An apparatus as described in claim 21, wherein the command data set generated by the command data set generator includes a data storage command set that is adapted to be executed by the target printer and a data transmission command set for sending the data storage command set to the target printer from a host device to which the target printer is connected, and wherein the file generator combines the data storage command set, data transmission command set, and the print data to create the data storage file.

23. An apparatus as described in claim 22, wherein the data transmission command set generated by the command data set generator includes an executable command set enabling input of communication parameter data including information regarding the target printer connection port when the host device opens the data storage file.

24. An apparatus as described in claim 22, wherein the data transmission command set generated by the command data set generator includes an executable command set for detecting and obtaining communication parameter data including information regarding the target printer connection port when the host device opens the data storage file.

* * * * *